Aug. 27, 1940.   G. HUHN   2,212,500
STUFFING-BOX PACKING
Filed May 28, 1938
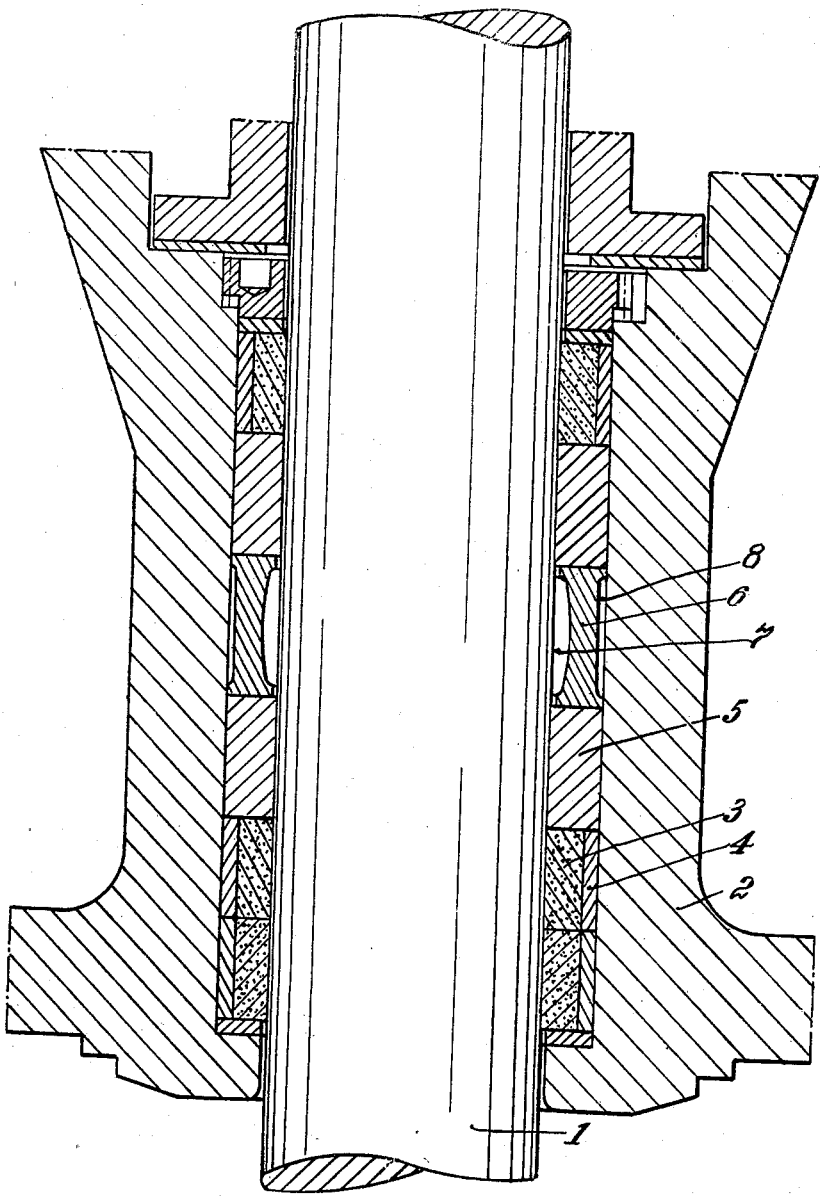
Inventor:
Gustav Huhn Patented Aug. 27, 1940

2,212,500

UNITED STATES PATENT OFFICE 2,212,500

STUFFING-BOX PACKING

Gustav Huhn, Berlin-Tempelhof, Germany

Application May 28, 1938, Serial No. 210,741
In Germany June 4, 1937

2 Claims. (Cl. 286—31)

In packing to prevent leakage of high pressure superheated steam and hot water, particularly in packing the stems of plug cocks and the like, it has been found exceedingly difficult to obtain a perfectly tight stuffing box since the latter is usually subjected to constant high pressure, yet must not be so tight as to cause objectionable friction interfering with easy operation of the cut-off valves and the like. String type packings and other fibrous packings, as well as rigid metal packings, are unsuitable both as to perfect sealing and slight friction, but I have devised a novel packing which overcomes the difficulties.

In my prior U. S. patent application Serial No. 101,886, filed September 21, 1936, an undivided graphite carbon ring jacketed with an undivided jacket ring of steel or the like, is described, the jacketed graphite carbon ring being produced by shrinking the jacket ring on the graphite carbon ring at a temperature surpassing the maximum working temperature ever to be encountered. Thus, the graphite carbon ring is held under compression at room or relatively low temperatures. As the packed rod, stem or the like expands under heat, the jacket ring also expands under heat and the graphite carbon ring which is incapable of appreciable expansion under the action of heat, will expand under the influence of the compression stored therein. Also, as the rod, stem or the like contracts upon cooling, the jacket ring again contracts and again places the graphite carbon ring under compression, reducing its diameter and causing it to remain in sealing contact with the rod, stem or the like. The use of these jacketed graphite carbon rings for the above purpose brings about a good seal against leakage but there is much to be desired regarding the free and easy moving of the rod, stem, spindle or the like, particularly if these jacketed graphite carbon packing rings be installed at room temperature and of such diameter as to tightly embrace the spindle or the like with a drive fit. It has been found that the spindle or the like will move somewhat easier at high temperatures, for, even if the metal jacket of the jacketed ring have the same coefficient of expansion as the spindle or the like, there is always a slight difference between expansion of the latter and that of the jacketed ring. Possibly the difference, hardly exceeding 1/100 of a mm., is caused by the fact that the jacketed graphite carbon rings are entirely encased in the stuffing box and are thus fully exposed to the highest working temperatures, whereas one end of the spindle or the like is exposed to the air and is cooled somewhat thereby. Perhaps also the difference in the diameters of the spindle and the outside diameter of the jacketed rings is involved in some way. At any rate, the difficulties above set forth exist when attempting to use the jacketed graphite carbon rings for the stated purpose. Moreover, there is no satisfactory result obtainable by slightly increasing the inner diameter of the jacketed rings in order to obtain easier movement of the spindle or the like at room temperature, for when so doing, the packing leaks at high pressures and high temperatures.

I have found that the difficulties above set forth can be overcome if soft graphite rings be used in combination with the jacketed graphite carbon rings described in the aforesaid application, particularly if said soft graphite rings be such as to those manufactured by compressing graphite, preferably flake graphite, under very high pressure. If these soft graphite rings be tightly confined between metal-jacketed graphite carbon rings in such a manner that the jacketed graphite carbon rings occupy the ends of the stuffing box and substantially the remainder of the box is filled with the soft graphite rings, even if the jacketed graphite carbon rings be a trifle larger than the spindle, a packing is obtained which remains tight even at the highest temperatures and pressures, yet permits easy operation of the spindle or the like at room temperature. This is accounted for by the relatively loose structure of the soft graphite rings permitting an easy movement of the spindle, even at room temperature, yet maintaining a perfectly tight seal at maximum pressures and temperatures. Then too, the jacketed graphite carbon rings fitted on the spindle with only an easy push fit prevent any particles of the soft graphite carbon rings from entering between the spindle and the graphite carbon rings and escaping, whereas the soft graphite rings could not stand the high pressures involved were it not for the support afforded by the jacketed graphite carbon rings. Since the dimensions of the packing must be such as to fill the packing space and substantially hermetically close the same from the time of installation, there are in certain cases some difficulties in removing the air from this packing space and if not removed, the air will be compressed with extremely high pressure between the individual rings, thereby so forcing the soft graphite rings against the spindle or the like as to impede spindle movement. This cannot be avoided by merely providing an air escape along the spindle since when so doing, there is the risk that with extreme pressures, the packing will loosen. According to my invention, this can be remedied by arranging one or more lantern-like rings provided with receiving or escaping spaces for the gaseous medium (air or the like) enclosed in the packed box. The air enclosed in this box enters these hollow spaces and does not hinder the motion of the spindle, particularly as it cannot act on the soft graphite rings.

The accompanying drawing illustrates in longitudinal section an embodiment of a stuffing-box packing in accordance with the invention.

The spindle 1 which is to be packed, is enclosed by a stuffing box 2. In the inner end of the packing space of this stuffing box 2, circumferentially continuous jacketed graphite carbon rings are provided. Each of these jacketed graphite carbon rings is composed of an undivided graphite carbon ring 3 and of an undivided jacket ring 4 of steel or the like so shrunk upon said graphite carbon ring 3 as to store circumferential and radial compression in the latter. The entire periphery of the graphite carbon ring 3 is surrounded by the jacket ring 4 but the side faces of said graphite carbon ring 3 are left exposed. These jacketed graphite carbon rings are inserted into the stuffing box 2 with an easy push fit. Outwardly they are followed by a soft graphite packing ring 5 of the nature above described and this ring is followed by a lantern-like ring 6 of steel, cast-iron or the like. In the embodiment of the invention herein disclosed, the ring 6 is provided both in the inner and in the outer side with gas-receiving or compensating spaces 7 and 8 respectively. The outer space 8 can be omitted but is preferably used. The lantern-like ring 6 is outwardly followed by another soft graphite packing ring such as 5 and this ring is followed by a jacketed graphite carbon ring such as the ring 3, 4.

A stuffing box packed as herein disclosed has proven to remain perfectly tight even if employing large spindles with a diameter of as much as 100 mm., and to permit free motion of the spindle with minimum friction.

I claim:

1. A stuffing-box packing assembly comprising spaced one-piece hard and brittle graphite carbon rings tightly surrounded by spaced one-piece metal jacket rings to provide spaced inherently rigid metal-jacketed graphite carbon rings, said metal jacketed graphite carbon rings being disposed at least at the extremities of the assembly, each of said graphite carbon rings having substantially no thermal expansion, each of said metal jacket rings being expansible under heat, each of said metal jacket rings being shrunk diametrically and circumferentially around the graphite carbon ring associated therewith to store diametrical and circumferential compression in said graphite carbon ring, and compressed graphite packing means tightly confined between said jacketed graphite carbon rings, said compressed graphite packing means and said jacketed graphite carbon rings having exposed side faces tightly contacting with each other, said jacketed graphite rings and said compressed graphite packing means being of sizes to completely fill the cross section of the packing space of the stuffing box, the relative internal diameters of said jacketed graphite carbon rings and said compressed graphite packing means being such that said jacketed graphite carbon rings will have an easy push fit on the part to be packed and said compressed graphite rings will have a force fit on said part.

2. A structure as specified in claim 1; together with a lantern-like ring in the stuffing box and provided with a receiving space for any gases compressed in the packed box when initially installing the packing assembly, said lantern-like ring being disposed about centrally between the ends of the assembly and having side faces snugly abutting side faces of the adjacent compressed graphite packing means.

GUSTAV HUHN.